(12) United States Patent
Lee et al.

(10) Patent No.: US 10,840,533 B2
(45) Date of Patent: Nov. 17, 2020

(54) SEPARATOR FOR A FUEL CELL AND A FUEL CELL STACK COMPRISING THE SAME

(71) Applicants: KOREA INSTITUTE OF SCIENCE AND TECHNOLOGY, Seoul (KR); INDUSTRY-ACADEMIC COOPERATION FOUNDATION, YONSEI UNIVERSITY, Seoul (KR)

(72) Inventors: Jong Ho Lee, Seoul (KR); Kyung Joong Yoon, Seoul (KR); Sang Hyeok Lee, Seoul (KR); Yong Gyun Bae, Seoul (KR); Dong Hwan Kim, Seoul (KR); Jong Sup Hong, Seoul (KR)

(73) Assignees: Korea Institute of Science and Technology, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 154 days.

(21) Appl. No.: 16/170,649

(22) Filed: Oct. 25, 2018

(65) Prior Publication Data

US 2019/0305351 A1    Oct. 3, 2019

(30) Foreign Application Priority Data

Mar. 30, 2018  (KR) .......................... 10-2018-0036939

(51) Int. Cl.
*H01M 8/2483* (2016.01)
*H01M 8/0247* (2016.01)
(Continued)

(52) U.S. Cl.
CPC ....... *H01M 8/2483* (2016.02); *H01M 8/0247* (2013.01); *H01M 8/0258* (2013.01); *H01M 8/2432* (2016.02); *H01M 2008/1293* (2013.01)

(58) Field of Classification Search
CPC ............. H01M 8/0247; H01M 8/0256; H01M 8/0258; H01M 8/2432; H01M 8/2483; H01M 2008/1293
(Continued)

(56) References Cited

U.S. PATENT DOCUMENTS

| 6,569,554 B1 | 5/2003 | Doggwiler et al. |
| 2003/0180603 A1* | 9/2003 | Richards ............... H01M 8/249 429/444 |

(Continued)

FOREIGN PATENT DOCUMENTS

| JP | 2008-004406 A | 1/2008 |
| JP | 2008-047395 A | 2/2008 |

(Continued)

*Primary Examiner* — Gregg Cantelmo
(74) *Attorney, Agent, or Firm* — Rabin & Berdo, P.C.

(57) ABSTRACT

This application relates to a separator for a fuel cell and a fuel cell stack with improved durability, which contains the same, particularly to a solid oxide fuel cell stack. Specifically, this application allows an oxidizer and a fuel to flow in a counter-flow manner and a cross-flow manner in the fuel cell stack by forming an outlet manifold and an inlet manifold to have a specific shape, location and size in the separator. As a result, interlayer peeling, microcracking, etc. are prevented because no variation in temperature, reactant concentration, power, etc. occurs between each unit cell and the power density per unit volume is significantly improved because the volume is minimized.

19 Claims, 21 Drawing Sheets

(51) Int. Cl.
*H01M 8/2432* (2016.01)
*H01M 8/0258* (2016.01)
*H01M 8/124* (2016.01)

(58) Field of Classification Search
USPC ................................. 429/456, 457, 458, 514
See application file for complete search history.

(56) References Cited

U.S. PATENT DOCUMENTS

2004/0038114 A1\* 2/2004 Wariishi .............. H01M 8/2457
 429/437
2011/0256462 A1\* 10/2011 Jung ................... H01M 8/0258
 429/457

FOREIGN PATENT DOCUMENTS

| | | |
|---|---|---|
| JP | 5714432 B2 | 5/2015 |
| KR | 10-2003-0076259 A | 9/2003 |
| KR | 10-0519414 B1 | 10/2005 |
| KR | 10-0821773 B1 | 4/2008 |

\* cited by examiner

SEPARATOR FOR A FUEL CELL AND A FUEL CELL STACK COMPRISING THE SAME

CROSS-REFERENCE TO RELATED APPLICATIONS

This application claims, under 35 U.S.C. § 119, the priority of Korean Patent Application No. 10-2018-0036939, filed on Mar. 30, 2018, in the Korean Intellectual Property Office, the disclosure of which is incorporated herein by reference in its entirety.

BACKGROUND

Technical Field

The present invention relates to a separator for a fuel cell and a fuel cell stack with improved durability, which contains the same, particularly to a solid oxide fuel cell stack.

Background Art

A solid oxide fuel cell (hereinafter, SOFC) can freely use, as a fuel, not only hydrogen but also existing hydrocarbon-based fuels such as natural gas, propane gas, LPG, etc. and future alternative fuels such as biofuels, etc. through internal reforming without an expensive external reformer. It is drawing a lot of attentions as one of the most promising future power sources due to very high fuel conversion efficiency.

An SOFC unit cell consists of an air electrode, a fuel electrode and an electrolyte disposed therebetween. An oxidizer such as air, oxygen, etc. is supplied to the air electrode and a fuel such as hydrogen, a hydrocarbon, etc. is supplied to the fuel electrode. If the air electrode and the fuel electrode are connected by an external circuit, oxygen is reduced at the air electrode due to the difference in oxygen partial pressure between the air electrode and the fuel electrode and oxygen ions are conducted to the fuel electrode through the electrolyte. At the fuel electrode, oxygen ions react with $H_2$ or a CO fuel to produce $H_2O$, $CO_2$ and heat. Electrons produced during the procedure do electrical work as they flow through the external circuit to the air electrode.

When higher power is needed, a plurality of SOFC unit cells are connected with each other to form a stack. Through this, systems of various capacities from watts to megawatts can be constructed. Therefore, SOFCs can be used in various applications from mobile power sources to household, building, transportation and large-scale power generation.

The SOFC unit cell is classified into a cylindrical type and a plate type depending on its shape. The plate type is advantageous in that performance loss caused by in-plane resistance is very little because the current flows in a direction perpendicular to the unit cell. In addition, power density per unit volume is very high because the stack can be constructed more densely than the cylindrical type.

However, the plate type is disadvantageous in terms of thermomechanical properties and stability during thermal cycles as compared to the cylindrical type. Considering that the SOFC is operated in the high-temperature ranges of 600-1,000° C., the low thermal stability can be a very fatal disadvantage.

Korean Patent Publication No. 2003-0076259 and U.S. Pat. No. 6,569,554 proposed a disc-shaped plate type unit cell to improve the durability of the plate type by increasing thermal stability. However, if the unit cell is prepared into a stack, thermal, mechanical, chemical and electrical stress occurs in the stack due to the difference in temperature, reactant concentration, pressure, current, etc. of the respective unit cells, leading to unsatisfactory durability. In particular, due to the nonuniform distribution of temperature and reactant concentration at the inlet manifold and the outlet manifold for an oxidizer or a fuel, the durability worsens greatly, showing interlayer peeling, microcracking, etc.

REFERENCES OF THE RELATED ART

Patent Documents (Patent document 1) Korean Patent Publication No. 2003-0076259.

(Patent document 2) U.S. Pat. No. 6,569,554.

SUMMARY

The present invention has been made to solve the problems of the prior art described above and to further improve the performance of an SOFC.

The present invention is directed to providing a separator for a fuel cell, which is capable of maintaining the overall temperature as much as possible, and a fuel cell stack containing the same.

The present invention is also directed to providing a separator for a fuel cell, which is capable of further increasing the power density per unit volume, and a fuel cell stack containing the same.

The purposes of the present invention are not limited to those described above. The purposes of the present invention will be apparent from the following description and will be embodied by the means described in the appended claims and combinations thereof.

The separator for a fuel cell according to the present invention contains: a tetragonal center portion; and a peripheral portion disposed to surround the center portion, wherein the peripheral portion contains: a first outlet manifold located at one pair of corners facing each other with respect to the center portion and formed through perforation; a second outlet manifold located at the other pair of corners facing each other with respect to the center portion and formed through perforation; a first inlet manifold located along the side of the center portion between the first outlet manifold and the second outlet manifold, adjacent to the second outlet manifold, and formed through perforation; and a second inlet manifold located along the side of the center portion between the first outlet manifold and the second outlet manifold, adjacent to the first outlet manifold, and formed through perforation.

The first outlet manifold may have a shape of an ellipse and may be formed to be spaced by a predetermined distance from the corners of the center portion such that an imaginary line extending from the major axis of the ellipse passes through both of the one pair of corners facing each other with respect to the center portion.

The first outlet manifold may have a shape of an ellipse and may be formed to be spaced by a predetermined distance from the corners of the center portion such that an angle formed between an imaginary line extending from the major axis of the ellipse and an imaginary line passing through both of the one pair of corners facing each other with respect to the center portion is 0-90°.

The first outlet manifold may be formed at a location satisfying Equation 1 and Equation 2:

$$\frac{1}{2} \le \frac{x_{1,out}}{a_1} \le 1 \quad \text{[Equation 1]}$$

wherein $a_1$ is the length of one side constituting the corners of the center portion adjacent to the first outlet manifold and $x_{1,out}$ is the shortest length between a perpendicular line extending from the midpoint of the one side and the center of the first outlet manifold $$\frac{1}{2} \le \frac{y_{1,out}}{a'_1} \le 1 \quad \text{[Equation 2]}$$

wherein $a_1'$ is the length of the other side constituting the corners of the center portion adjacent to the first outlet manifold and $y_{1,out}$ is the shortest length between a perpendicular line extending from the midpoint of the other side and the center of the first outlet manifold.

The first outlet manifold may have a shape of an ellipse satisfying Equation 3 and Equation 4:

$$0 < \frac{2 \cdot r_{11,out}}{L} \le 0.2 \quad \text{[Equation 3]}$$

wherein $r_{11,out}$ is the semi-major axis of the first outlet manifold and L is the distance between the corners of the center portion facing each other $$0 < \frac{r_{12,out}}{r_{11,out}} < 1 \quad \text{[Equation 4]}$$

wherein $r_{11,out}$ is the semi-major axis of the first outlet manifold and $r_{12,out}$ is the semi-minor axis of the first outlet manifold.

The second outlet manifold may have a shape of an ellipse and may be formed to be spaced by a predetermined distance from the corners of the center portion such that an imaginary line extending from the major axis of the ellipse passes through both of the one pair of corners facing each other with respect to the center portion.

The second outlet manifold may have a shape of an ellipse and may be formed to be spaced by a predetermined distance from the corners of the center portion such that an angle formed between an imaginary line extending from the major axis of the ellipse and an imaginary line passing through both of the one pair of corners facing each other with respect to the center portion is 0-90°.

The second outlet manifold may be formed at a location satisfying Equation 5 and Equation 6:

$$\frac{1}{2} \le \frac{x_{2,out}}{a_2} \le 1 \quad \text{[Equation 5]}$$

wherein $a_2$ is the length of one side constituting the corners of the center portion adjacent to the second outlet manifold and $x_{2,out}$ is the shortest length between a perpendicular line extending from the midpoint of the one side and the center of the second outlet manifold $$\frac{1}{2} \le \frac{y_{2,out}}{a'_2} \le 1 \quad \text{[Equation 6]}$$

wherein $a_2'$ is the length of the other side constituting the corners of the center portion adjacent to the second outlet manifold and $y_{2,out}$ is the shortest length between a perpendicular line extending from the midpoint of the other side and the center of the second outlet manifold.

The second outlet manifold may have a shape of an ellipse satisfying Equation 7 and Equation 8:

$$0 < \frac{2 \cdot r_{21,out}}{L} \le 0.2 \quad \text{[Equation 7]}$$

wherein $r_{21,out}$ is the semi-major axis of the second outlet manifold and L is the distance between the corners of the center portion facing each other $$0 < \frac{r_{22,out}}{r_{21,out}} < 1 \quad \text{[Equation 8]}$$

wherein $r_{21,out}$ is the semi-major axis of the second outlet manifold and $r_{22,out}$ is the semi-minor axis of the second outlet manifold.

The first inlet manifold and the second inlet manifold may be formed through perforation to have a shape wherein the ends of semicircles having the same or different radius and spaced by a predetermined distance are connected by straight lines, wherein one or more of the straight lines connecting the ends of the semicircles is parallel or approximately parallel to the side of the center portion.

The first inlet manifold and the second inlet manifold may be formed through perforation to have a shape wherein the semicircles have different radius, the semicircle having a longer radius from among the semicircles is located toward the corner of the center portion and the straight line closer to the center portion from among the straight lines connecting the ends of the semicircles is parallel to the side of the center portion.

The first inlet manifold and the second inlet manifold may be formed through perforation to have a shape wherein an angle formed between the straight line farther from the center portion from among the straight lines connecting the ends of the semicircles and the side of the center portion is greater than 0° and equal to or smaller than 45°.

The first inlet manifold may be formed to have a size satisfying Equation 9 and Equation 10:

$$0 < \frac{r_{1,in}}{a_3} \le \frac{1}{4} \quad \text{[Equation 9]}$$

wherein $r_{1,in}$ is the radius of the semicircles located at both ends of the first inlet manifold and $a_3$ is the length of the side of the center portion adjacent to the first inlet manifold $$0 \le \frac{d_1}{a_3} \le \frac{1}{2} \quad \text{[Equation 10]}$$

wherein $d_1$ is the distance between the centers of the semicircles located at both ends of the first inlet manifold and $a_3$ is the length of the side of the center portion adjacent to the first inlet manifold.

The first inlet manifold may be formed at a location satisfying Equation 11 and Equation 12:

$$0.2 \leq \frac{x_{1,in}}{a_3} \leq 0.4 \quad \text{[Equation 11]}$$

wherein $a_3$ is the length of one side of the center portion adjacent to the first inlet manifold and $x_{1,in}$ is the shortest length between a perpendicular line extending from the midpoint of the one side and the center of gravity of the first inlet manifold $$\frac{1}{2} \leq \frac{y_{1,in}}{a_3'} \leq 1 \quad \text{[Equation 12]}$$

wherein $a_3'$ is the length of the other side connected to the one side of the center portion adjacent to the first inlet manifold and $y_{1,in}$ is the shortest length between a perpendicular line extending from the midpoint of the other side and the center of gravity of the first inlet manifold.

The second inlet manifold may be formed to have a size satisfying Equation 13 and Equation 14:

$$0 < \frac{r_{2,in}}{a_4} \leq \frac{1}{4} \quad \text{[Equation 13]}$$

wherein $r_{2,in}$ is the radius of the semicircles located at both ends of the second inlet manifold and $a_4$ is the length of the side of the center portion adjacent to the second inlet manifold $$0 \leq \frac{d_2}{a_4} \leq \frac{1}{2} \quad \text{[Equation 14]}$$

wherein $d_2$ is the distance between the centers of the semicircles located at both ends of the second inlet manifold and $a_4$ is the length of the side of the center portion adjacent to the second inlet manifold.

The second inlet manifold may be formed at a location satisfying Equation 15 and Equation 16:

$$0.2 \leq \frac{x_{2,in}}{a_4} \leq 0.4 \quad \text{[Equation 15]}$$

wherein $a_4$ is the length of one side of the center portion adjacent to the second inlet manifold and $x_{2,in}$ is the shortest length between a perpendicular line extending from the midpoint of the one side and the center of gravity of the second inlet manifold $$\frac{1}{2} \leq \frac{y_{2,in}}{a_4'} \leq 1 \quad \text{[Equation 16]}$$

wherein $a_4'$ is the length of the other side connected to the one side of the center portion adjacent to the second inlet manifold and $y_{2,in}$ is the shortest length between a perpendicular line extending from the midpoint of the other side and the center of gravity of the second inlet manifold.

The first outlet manifold may be formed through perforation to have a larger area than the second outlet manifold and the first inlet manifold may be formed through perforation to have a larger area than the second inlet manifold The fuel cell stack according to the present invention may be one wherein a unit cell containing an air electrode, an electrolyte and a fuel electrode and the separator described above are stacked alternatingly.

An oxidizer introduced into the first inlet manifold located along an imaginary line parallel to one side of the center portion may pass through the air electrode and then may be discharged out of the first outlet manifold located along the imaginary line and a fuel introduced into the second inlet manifold located along an imaginary line parallel to one side of the center portion may pass through the fuel electrode and then may be discharged out of the second outlet manifold located along the imaginary line.

In the fuel cell stack, the oxidizer and the fuel may flow in a cross-flow manner and in a counter-flow manner.

When the separator for a fuel cell according to the present invention is used, the thermal gradient in each unit cell can be minimized because the oxidizer and the fuel can flow in the fuel cell stack in a counter-flow manner.

Also, when the separator for a fuel cell according to the present invention is used, the power density per unit volume can be increased significantly because the volume of the stack can be minimized since the oxidizer and the fuel create a cross flow surrounding the four sides of the unit cell.

The fuel cell stack according to the present invention has the advantages of both the counter-flow stack structure and the cross-flow stack structure.

The effect of the present invention is not limited to that described above. It is to be understood that the effect of the present invention includes all the effects that can be inferred from the following description.

[Detailed Description of Main Elements]

Figure 1:
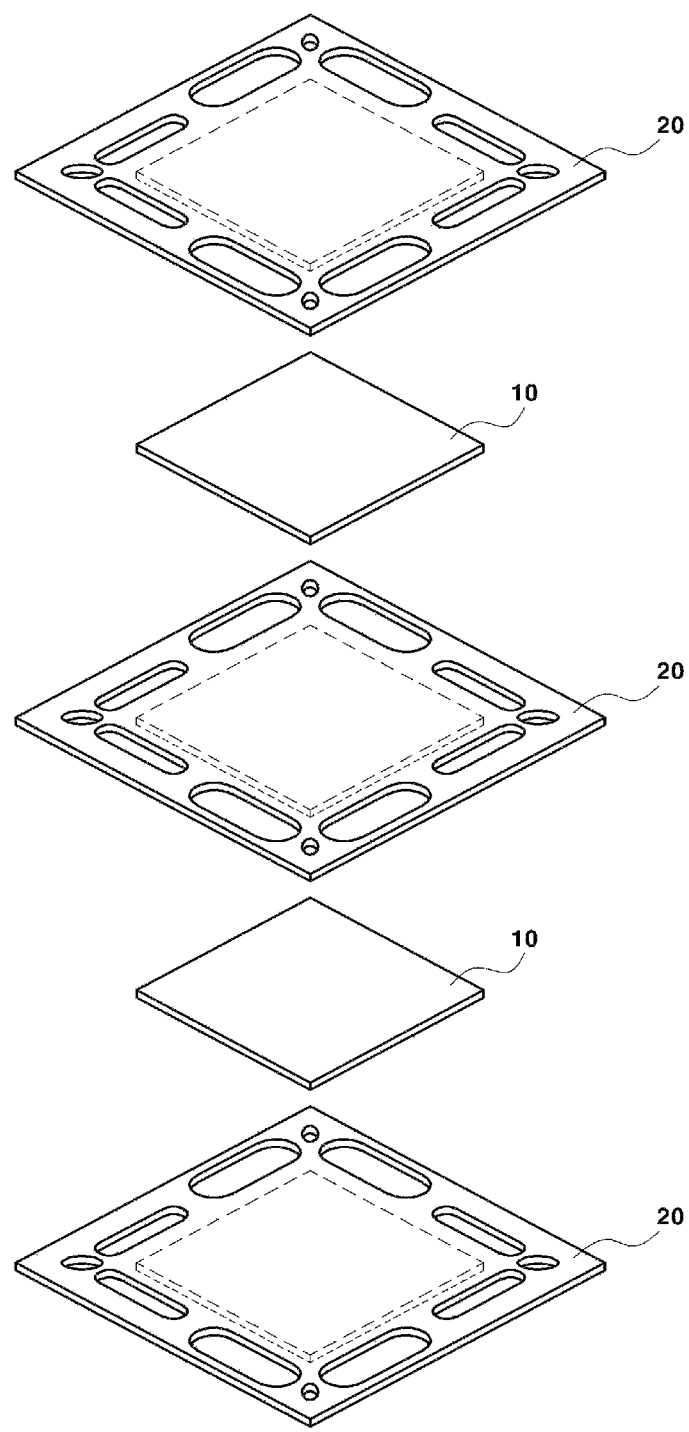
FIG. 1 is an exploded perspective view of the major part of a fuel cell stack according to an exemplary embodiment of the present invention.

| | | |
|---|---|---|
| 1: fuel cell stack | | |
| 10: unit cell | 11: air electrode | 12: electrolyte |
| 13: fuel electrode | | |
| 20: separator | 21: center portion | 22: peripheral portion |
| 221: first outlet manifold | 222: second outlet manifold | |
| 223: first inlet manifold | 224: second inlet manifold | |

DETAILED DESCRIPTION

Other objectives, features and advantages of the present invention will be easily understood through the following detailed description of specific exemplary embodiments and the attached drawings. However, the present invention is not limited to the exemplary embodiments and may be embodied in other forms. On the contrary, the exemplary embodiments are provided so that the disclosure of the present invention is completely and fully understood by those of ordinary skill.

In the attached drawings, like numerals are used to represent like elements. In the drawings, the dimensions of the elements are magnified for easier understanding of the present invention. Although the terms first, second, etc. may be used to describe various elements, these elements should not be limited by the terms. The terms are used only to distinguish one element from another. For example, a first element can be termed a second element and, similarly, a second element can be termed a first element, without departing from the scope of the present invention. A singular expression includes a plural expression unless the context clearly indicates otherwise.

In the present disclosure, the terms such as "include", "contain", "have", etc. should be understood as designating that features, numbers, steps, operations, elements, parts or combinations thereof exist and not as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" the another element or an intervening element may also be present. Likewise, when an element such as a layer, a film, a region, a substrate, etc. is referred to as being "under" another element, it can be "directly under" the another element or an intervening element may also be present.

Unless specified otherwise, all numbers, values and/or expressions that represent the components, reaction conditions and the quantity polymer compositions and mixtures used in the present invention represent approximate measures or limits to ranges to encompass minor deviations from the given values and are to be understood to be modified by "about". Also, the numerical ranges described in this disclosure are continuous and include all the values from the minimum value to the maximum value included in the ranges, unless specified otherwise. In addition, if the range indicates integers, all the integers from the minimum value to the maximum value are included.

Throughout this disclosure, the numerical ranges described for parameters are to be understood to include all the values included in the ranges including the described end points. For example, a range of "5-10" is to be understood to include not only the values 5, 6, 7, 8, 9 and 10 but also the subranges thereof such as 6-10, 7-10, 6-9, 7-9, etc. and any values between appropriate integers in the ranges such as 5.5, 6.5, 7.5, 5.5-8.5, 6.5-9, etc. In addition, a range of "10-30%", for example, is to be understood to include not only all the inter values 10%, 11%, 12%, 13%, . . . , 30% but also the subranges thereof such as 10-15%, 12-18%, 20-30%, etc. and any values between appropriate integers in the ranges such as 10.5%, 15.5%, 25.5%, etc.

Figure 2:
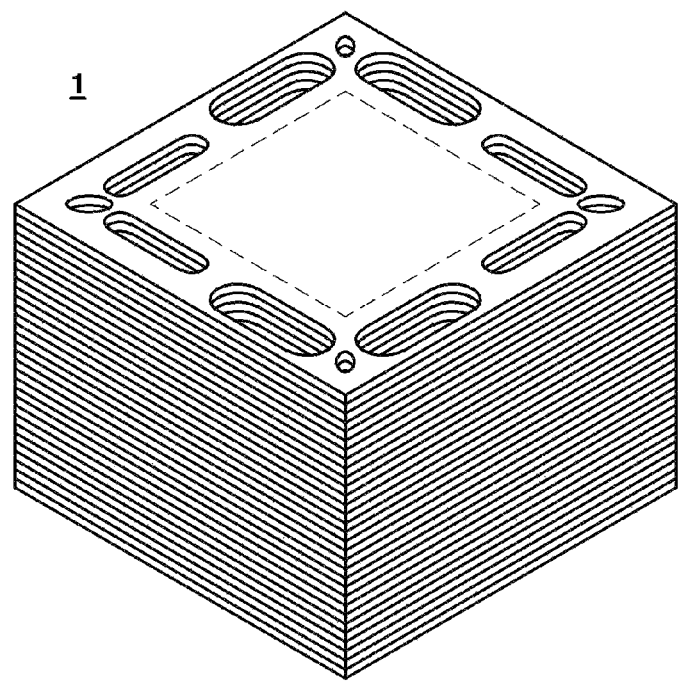
FIG. 2 is a perspective view of a fuel cell stack according to an exemplary embodiment of the present invention.

FIG. 1 is an exploded perspective view of the major part of a fuel cell stack 1 according to an exemplary embodiment of the present invention. Referring to the figure, the fuel cell stack 1 may be one wherein a unit cell 10 containing an air electrode, an electrolyte and a fuel electrode and a separator 20 are stacked alternatingly. FIG. 2 is a perspective view of the fuel cell stack 1 obtained by alternatingly stacking the unit cell 10 and the separator 20 of FIG. 1.

For example, the fuel cell stack 1 may be a solid oxide fuel cell (SOFC) stack.

Figure 3:
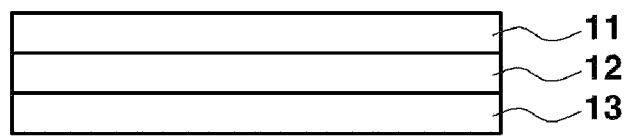
FIG. 3 is a cross-sectional view of a unit cell contained in a fuel cell stack according to an exemplary embodiment of the present invention.

FIG. 3 is a cross-sectional view of the unit cell 10. Referring to the figure, the unit cell 10 may contain an air electrode 11, an electrolyte 12 and a fuel electrode 13.

When an oxidizer such as air, oxygen, etc. is supplied to the air electrode 11, oxygen ions are generated via a reaction of Scheme 1.

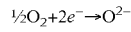
[Scheme 1]

The oxygen ion is transported to the fuel electrode 13 through the electrolyte 12.

When a fuel such as hydrogen, a hydrocarbon, etc. is supplied to the fuel electrode 13, water is produced as the oxygen ions react with the fuel according to Scheme 2 and electrons are emitted.

$$O^{2-} + H_2 \rightarrow H_2O + 2e^-$$ [Scheme 2]

The oxygen ions generated from the oxidizer at the air electrode 11 are transported toward the fuel electrode 13 due to the concentration gradient of the oxygen ions and the electrons flow from the fuel electrode 13 to the air electrode 11 through an external circuit which electrically connects the air electrode 11 and the fuel electrode 13.

The electrolyte 12 blocks the permeation of the oxidizer and the fuel. Although it does not conduct the electrons, it may be permeable to the oxygen ions.

As described above, the oxygen ions are transported from the air electrode 11 to the fuel electrode 13. If the balance of the overall charge is maintained, a useful power may be produced through oxidation of the fuel. During the procedure, only pure water and heat are produced as byproducts, which may also be utilized usefully.

The unit cell 10 may further contain, between the air electrode 11 and the separator 20 and/or between the fuel electrode 13 and the separator 20, a current collector (not shown).

Figure 4:
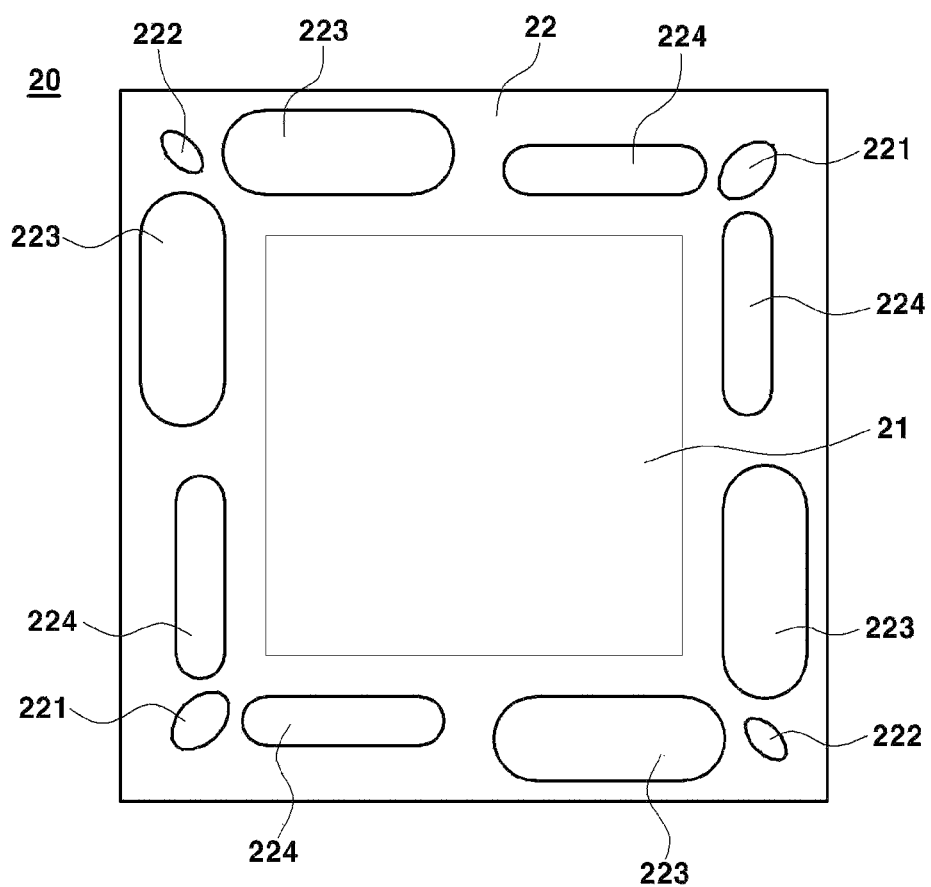
FIG. 4 is a plan view of a separator contained in a fuel cell stack according to an exemplary embodiment of the present invention.
Figure 5:
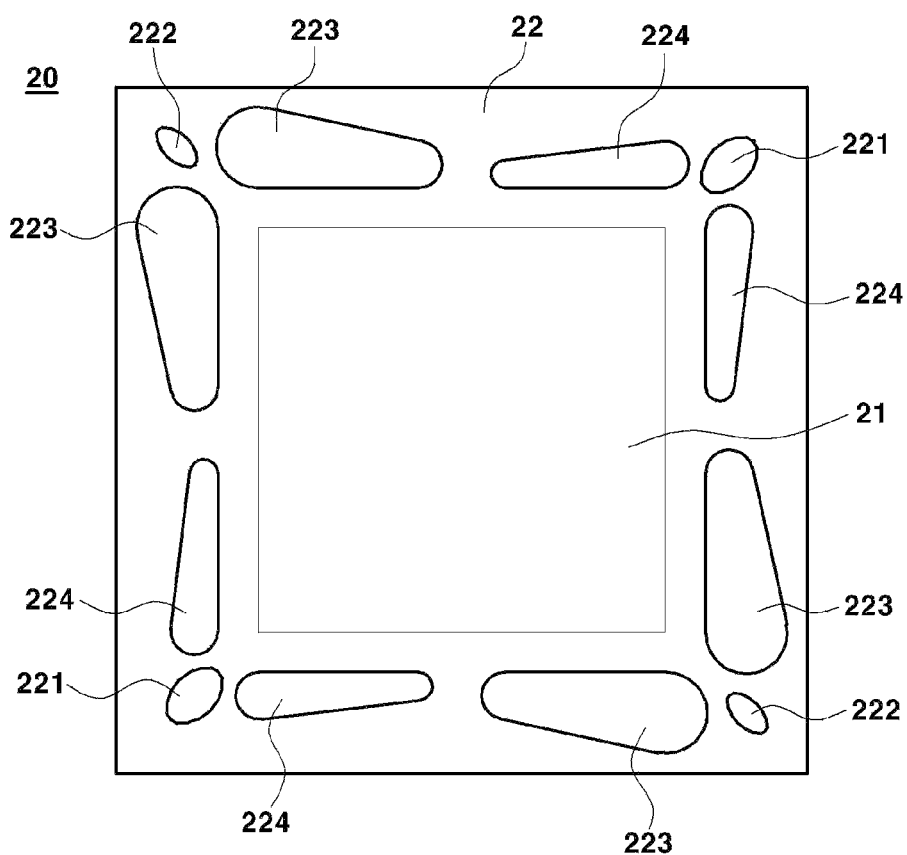
FIG. 5 is a plan view of a separator contained in a fuel cell stack according to another exemplary embodiment of the present invention.

FIG. 4 is a plan view of the separator 20 according to an exemplary embodiment of the present invention. FIG. 5 is a plan view of the separator 20 according to another exemplary embodiment of the present invention. Referring to the figures, the separator 20 may contain: a center portion 21 which is formed at a location adjacent to the unit cell 10 when forming the stack; and a peripheral portion 22 which surrounds the center portion 21 and contains manifolds 221, 222, 223, 224 formed for inlet or outlet of an oxidizer or a fuel through perforation.

The center portion 21 and the manifolds 221, 222, 223, 224 may be divided so that they do not overlap with each other.

The center portion 21 may have a shape and a size identical or similar to those of the unit cell 10. Specifically, it may have a rectangular shape such as a square, a rectangle, etc. and may have a size covering the unit cell 10 wholly or partly. FIGS. 4-18 describe the present invention for the case where the center portion 21 is square-shaped. However, the present invention is not limited thereto and it should be understood that the separator 20 may contain the center portion 21 which has a rectangular shape or a shape that can be easily changed therefrom.

The center portion 21 may be either actually formed with a specific shape or form or conceptually divided on the separator 20.

The center portion 21 may be equipped with a circulation flow channel (not shown) for guiding an oxidizer or a fuel in the unit cell 10.

The peripheral portion 22 refers to a space with a specific shape and size, which extends around the center portion 21, and may contain a first outlet manifold 221 for discharge of an oxidizer, a second outlet manifold 222 for discharge of a fuel, a first inlet manifold 223 for inflow of an oxidizer and a second inlet manifold 224 for inflow of a fuel.

The present invention is characterized in that the flow distribution of an oxidizer and a fuel inside the fuel cell stack 1 is controlled and the volume of the fuel cell stack 1 is minimized by forming the first outlet manifold 221, the second outlet manifold 222, the first inlet manifold 223 and the second inlet manifold 224 at specific locations of the peripheral portion 22 with specific shapes.

Specifically, the first outlet manifold 221, the second outlet manifold 222, the first inlet manifold 223 and the second inlet manifold 224 are located near the corners of the center portion 21, such that the oxidizer and the fuel can form a counter flow and a cross flow at the same time in the fuel cell stack 1.

Figure 6:
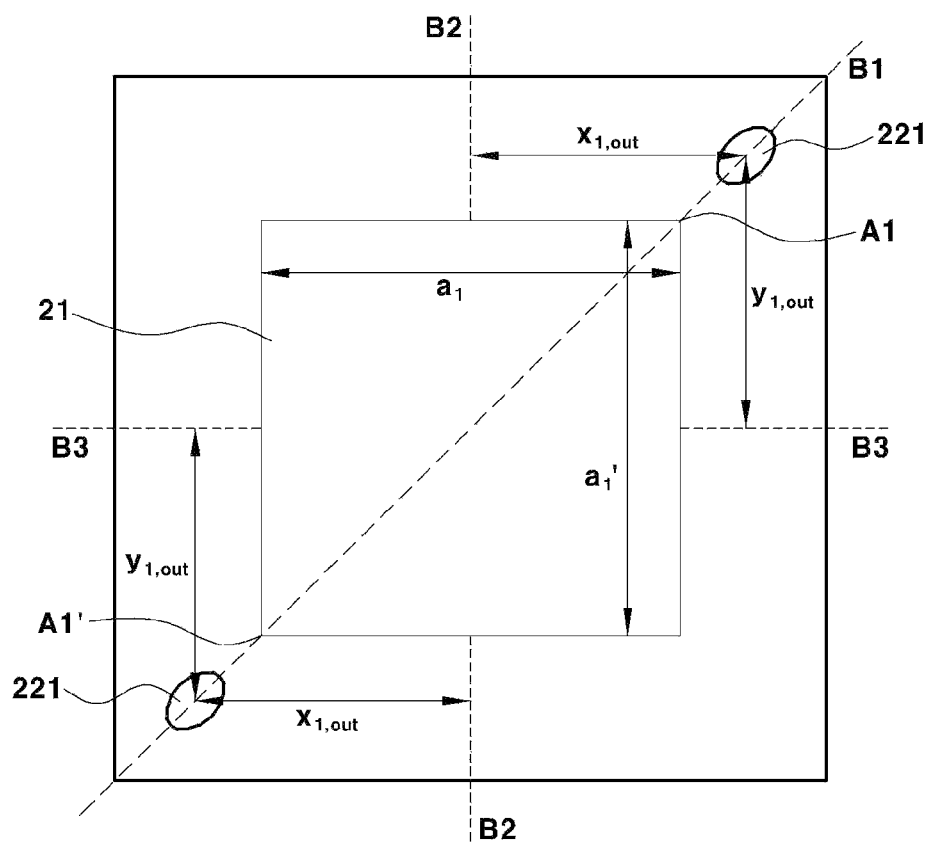
FIG. 6 is a reference view for illustrating the shape and location of a first outlet manifold of a separator.

FIG. 6 is a reference view for illustrating the shape and location of the first outlet manifold 221. Referring to the figure, the first outlet manifold 221 may be located at one pair of corners A1, A1' facing each other with respect to the center portion 21 and formed through perforation.

In the present invention, "the corner of the center portion" refers to a location near the corner of the center portion 21, which is located at the peripheral portion 22 separated from the space defined by the center portion 21.

Specifically, the first outlet manifold 221 may have a shape of an ellipse and may be formed to be spaced by a predetermined distance from the corners A1, A1' of the center portion 21 such that an imaginary line B1 extending from the major axis of the ellipse passes through both of the one pair of corners A1, A1' facing each other with respect to the center portion 21.

Figure 7:
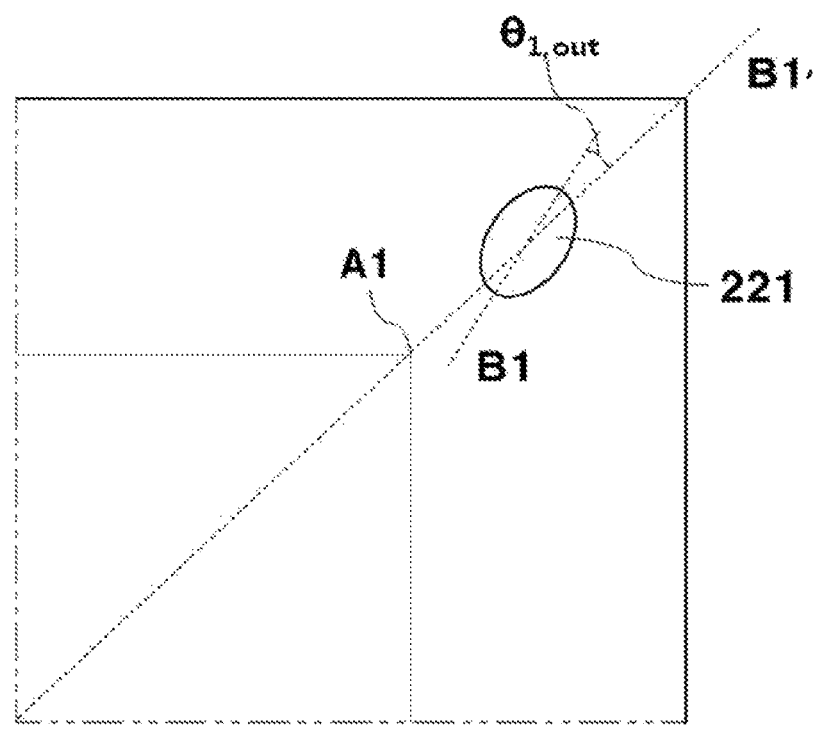
FIG. 7 is a reference view for illustrating the shape of a first outlet manifold of a separator.

Also, as seen from FIG. 7, the first outlet manifold 221 may have a shape of an ellipse and may be formed to be spaced by a predetermined distance from the corners A1 of the center portion 21 such that an angle $\theta_{1,out}$ formed between an imaginary line B1 extending from the major axis of the ellipse and an imaginary line B1' passing through both of the one pair of corners A1, A1' facing each other with respect to the center portion 21 is 0-90°.

Also, the first outlet manifold 221 may be formed at a location satisfying Equation 1 and Equation 2:

$$\frac{1}{2} \leq \frac{x_{1,out}}{a_1} \leq 1 \quad \text{[Equation 1]}$$

wherein $a_1$ is the length of one side constituting the corners A1, A1' of the center portion 21 adjacent to the first outlet manifold 221 and $x_{1,out}$ is the shortest length between a perpendicular line B2 extending from the midpoint of the one side and the center of the first outlet manifold 221

$$\frac{1}{2} \leq \frac{y_{1,out}}{a_1'} \leq 1 \quad \text{[Equation 2]}$$

wherein $a_1'$ is the length of the other side constituting the corners A1, A1' of the center portion 21 adjacent to the first outlet manifold 221 and $y_{1,out}$ is the shortest length between a perpendicular line B3 extending from the midpoint of the other side and the center of the first outlet manifold 221.

Figure 8:
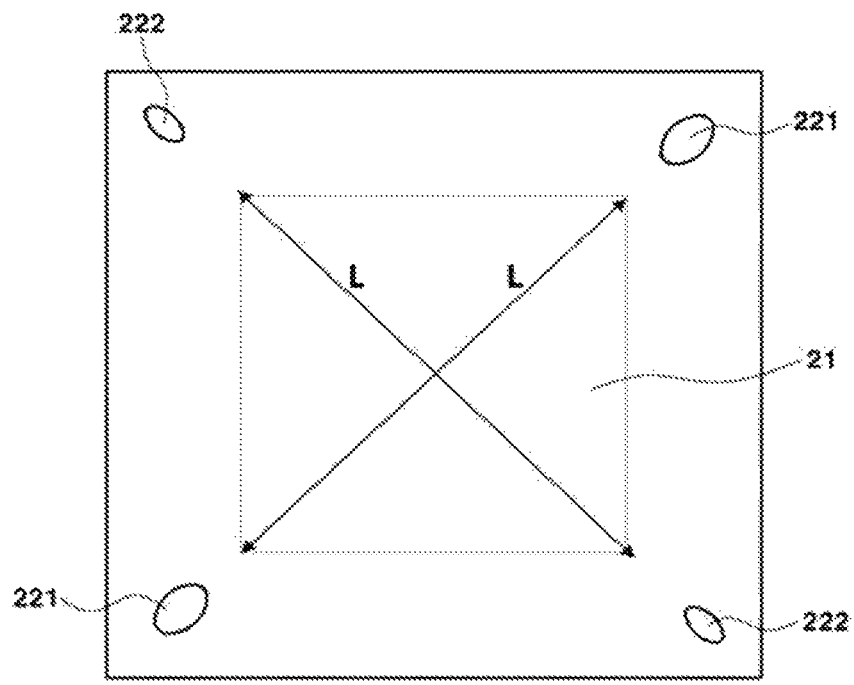
FIG. 8 is a reference view for illustrating the elliptical shape of a first outlet manifold of a separator.
Figure 9:
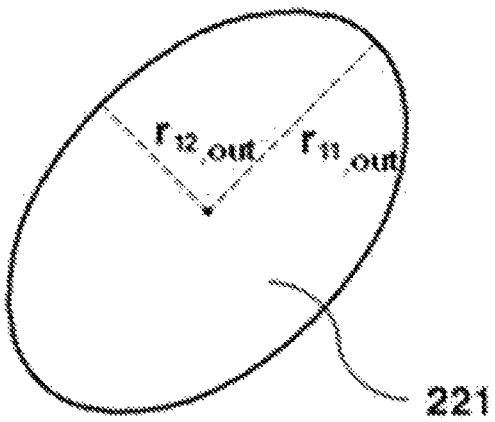
FIG. 9 shows the shape of a first outlet manifold of a separator.

FIG. 8 and FIG. 9 are reference views for illustrating the elliptical shape of the first outlet manifold 221. Referring to the figures, the first outlet manifold 221 may have a shape of an ellipse satisfying Equation 3 and Equation 4:

$$0 < \frac{2 \cdot r_{11,out}}{L} \leq 0.2 \quad \text{[Equation 3]}$$

wherein $r_{11,out}$ is the semi-major axis of the first outlet manifold 221 and L is the distance between the corners of the center portion 21 facing each other $$0 < \frac{r_{12,out}}{r_{11,out}} < 1 \qquad \text{[Equation 4]}$$

wherein $r_{11,out}$ is the semi-major axis of the first outlet manifold 221 and $r_{12,out}$ is the semi-minor axis of the first outlet manifold 221.

Figure 10:
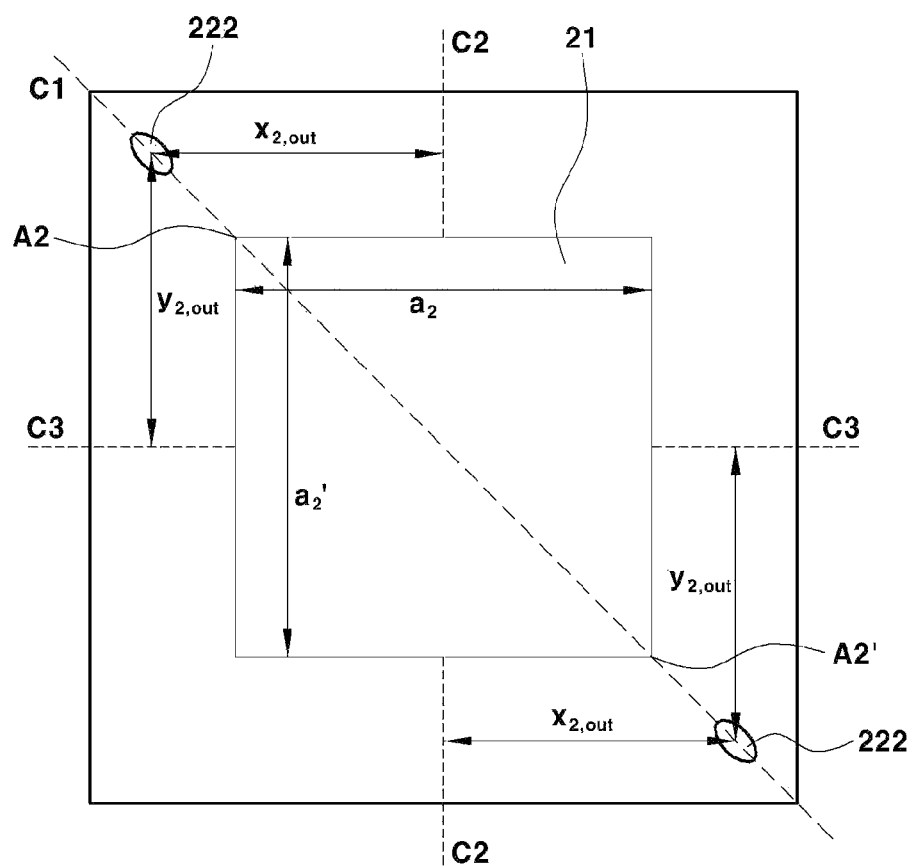
FIG. 10 is a reference view for illustrating the shape and location of a second outlet manifold of a separator.

FIG. 10 is a reference view for illustrating the shape and location of the second outlet manifold 222. Referring to the figure, the second outlet manifold 222 may be located at the other pair of corners A2, A2' facing each other with respect to the center portion 21 and formed through perforation;

Specifically, the second outlet manifold 222 may have a shape of an ellipse and may be formed to be spaced by a predetermined distance from the corners A2, A2' of the center portion 21 such that an imaginary line C1 extending from the major axis of the ellipse passes through both of the one pair of corners A2, A2' facing each other with respect to the center portion 21.

Figure 11:
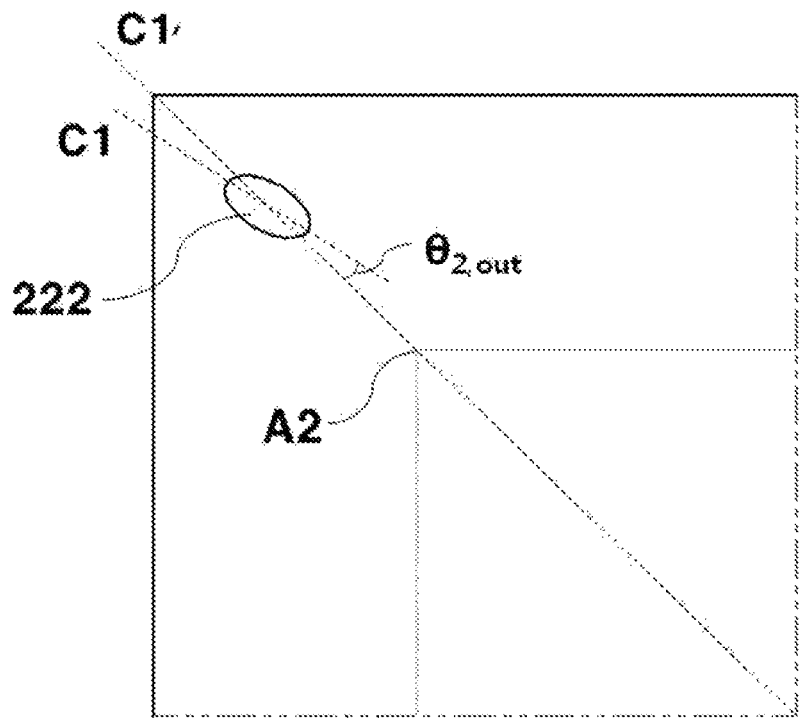
FIG. 11 is a reference view for illustrating the shape of a second outlet manifold of a separator.

Also, as seen from FIG. 11, the second outlet manifold 222 may have a shape of an ellipse and may be formed to be spaced by a predetermined distance from the corners A2 of the center portion 21 such that an angle $\theta_{2,out}$ formed between an imaginary line C1 extending from the major axis of the ellipse and an imaginary line C1' passing through both of the one pair of corners A2, A2' facing each other with respect to the center portion 21 is 0-90°.

Also, the second outlet manifold 222 may be formed at a location satisfying Equation 5 and Equation 6:

$$\frac{1}{2} \leq \frac{x_{2,out}}{a_2} \leq 1 \qquad \text{[Equation 5]}$$

wherein $a_2$ is the length of one side constituting the corners A2, A2' of the center portion 21 adjacent to the second outlet manifold 222 and $x_{2,out}$ is the shortest length between a perpendicular line C2 extending from the midpoint of the one side and the center of the second outlet manifold 222

$$\frac{1}{2} \leq \frac{y_{2,out}}{a'_2} \leq 1 \qquad \text{[Equation 6]}$$

wherein $a_2'$ is the length of the other side constituting the corners A2, A2' of the center portion 21 adjacent to the second outlet manifold 222 and $y_{2,out}$ is the shortest length between a perpendicular line C3 extending from the midpoint of the other side and the center of the second outlet manifold 222.

Figure 12:
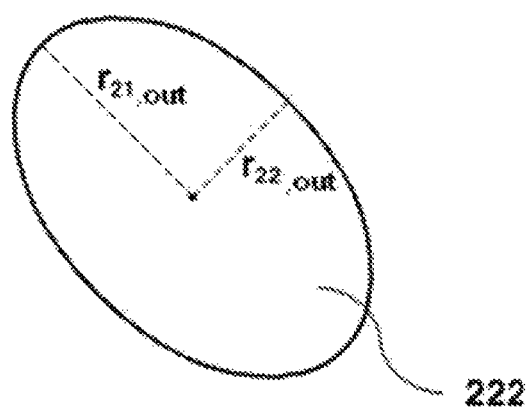
FIG. 12 shows the shape of a second outlet manifold of a separator.

FIG. 8 and FIG. 12 are reference views for illustrating the elliptical shape of the second outlet manifold 222. Referring to the figures, the second outlet manifold 222 may have a shape of an ellipse satisfying Equation 7 and Equation 8:

$$0 < \frac{2 \cdot r_{21,out}}{L} \leq 0.2 \qquad \text{[Equation 7]}$$

wherein $r_{21,out}$ is the semi-major axis of the second outlet manifold 222 and L is the distance between the corners of the center portion 21 facing each other $$0 < \frac{r_{22,out}}{r_{21,out}} < 1 \qquad \text{[Equation 8]}$$

wherein $r_{21,out}$ is the semi-major axis of the second outlet manifold 222 and $r_{22,out}$ is the semi-minor axis of the second outlet manifold 222.

The first outlet manifold 221 may be formed through perforation to have a larger area than the second outlet manifold 222. When the fuel cell stack 1 is operated, the required amount of the oxidizer is larger than that of the fuel and the flow rate is also about 10 times faster. Therefore, if the first outlet manifold 221 from which the oxidizer is discharged and the second outlet manifold 222 from which the fuel is discharged are formed to have the same or similar area, it is highly likely that pressure difference occurs in the fuel cell stack 1. Accordingly, in the present invention, the first outlet manifold 221 is formed to have a larger area than the second outlet manifold 222, thereby decreasing the flow rate of the oxidizer inside the fuel cell stack 1 and reducing pressure difference resulting therefrom.

Figure 13:
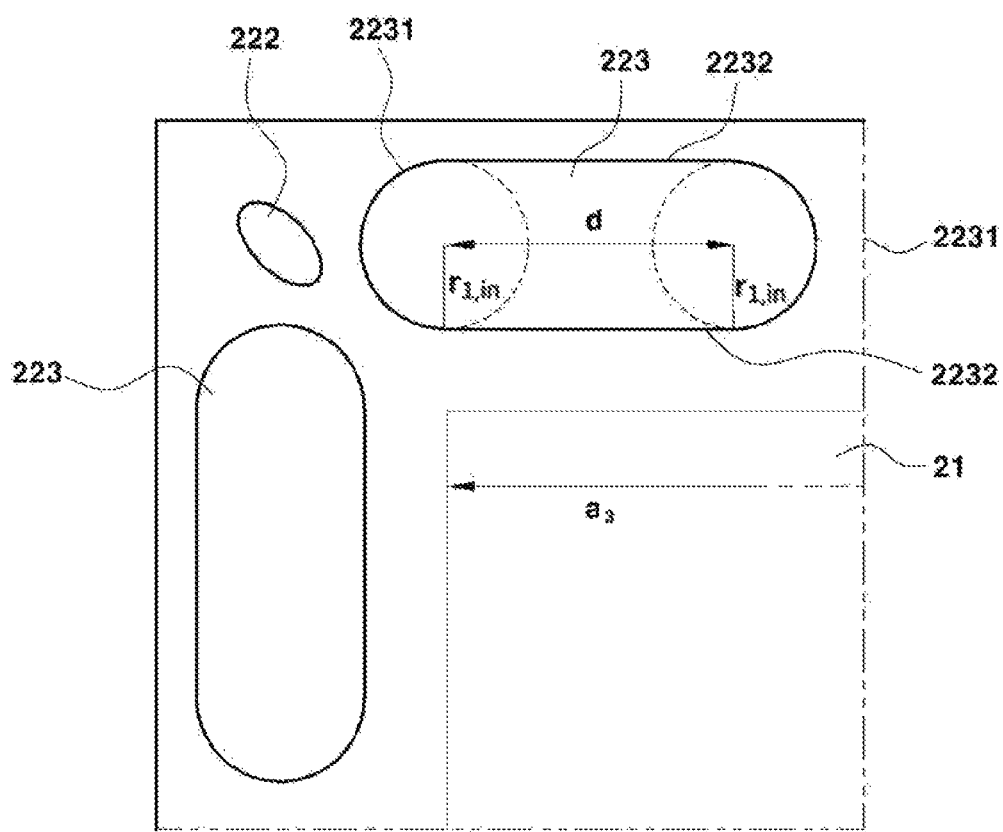
FIG. 13 is a reference view for illustrating the shape and location of a first inlet manifold of a separator according to an exemplary embodiment of the present invention.

FIG. 13 is a reference view for illustrating the shape and location of the first inlet manifold 223. Referring to FIG. 4 and FIG. 13, the first inlet manifold 223 may be located along the side of the center portion 21 between the first outlet manifold 221 and the second outlet manifold 222, adjacent to the second outlet manifold 222, and formed through perforation.

In the present disclosure, "located along the side of the center portion" means that it is located in the peripheral portion 22 separated from the space defined by the center portion 21, on an imaginary line which is parallel or approximately parallel to the side of the center portion 21. However, it should not be understood as if the location along the side of the center portion 21 means any special relationship, e.g., being parallel or perpendicular to, with the imaginary line.

Specifically, the first inlet manifold 223 may be formed through perforation to have a shape wherein the ends of semicircles 2231 having the same radius $r_{1,in}$ and spaced by a predetermined distance are connected by straight lines 2232, wherein the straight lines 2232 connecting the ends of the semicircles 2231 are parallel or approximately parallel to the side of the center portion 21.

Figure 14:
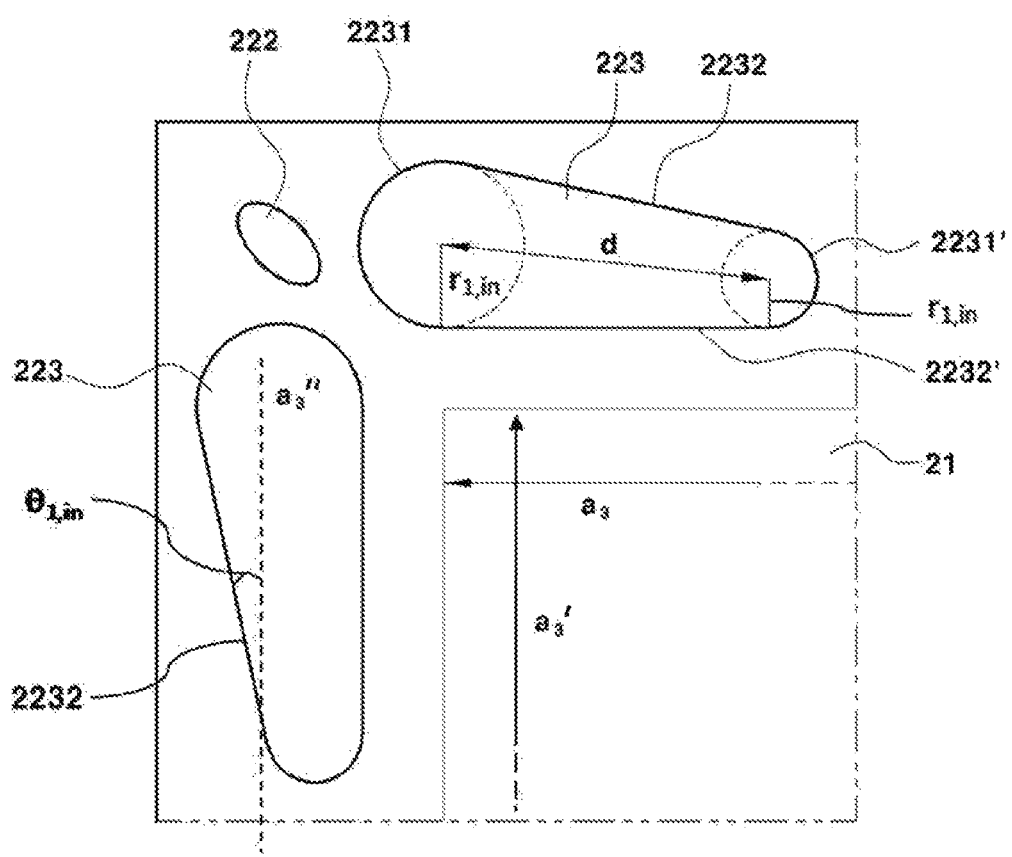
FIG. 14 is a reference view for illustrating the shape and location of a first inlet manifold of a separator according to another exemplary embodiment of the present invention.

As seen from FIG. 14, the first inlet manifold 223 may be formed through perforation to have a shape wherein the semicircles 2231, 2231' have different radius, the semicircle 2231 having a longer radius from among the semicircles 2231, 2231' is located toward the corner of the center portion 21 and the straight line 2232' closer to the center portion 21 from among the straight lines 2232, 2232' connecting the ends of the semicircles 2231, 2231' is parallel or approximately parallel to the side of the center portion 21.

Also, the first inlet manifold 223 may be formed through perforation to have a shape wherein an angle $\theta_{1,in}$ formed between the straight line 2232 farther from the center portion 21 from among the straight lines 2232, 2232' connecting the ends of the semicircles 2231, 2231' and the side $a_3$ or $a_3'$ of the center portion 21 (or an imaginary line $a_3''$ which is parallel to the side of the center portion 21) is greater than 0° and equal to or smaller than 45°.

If the first inlet manifold 223 is formed to have a symmetrical shape, the flow volume of the oxidizer introduced near the corner of the center portion becomes the same or similar to the flow volume of the oxidizer introduced near the midpoint of one side of the center portion. In this case, it is highly likely that the oxidizer may not flow smoothly near the center of the unit cell 10 at which the center portion is located due to hydrodynamic flow resistance. Therefore, by forming the first inlet manifold 223 asymmetrically as shown in FIG. 14, the flow volume of the oxidizer introduced near the corner of the center portion may be increased and, accordingly, the oxidizer may flow smoothly near the center of the unit cell 10.

The first inlet manifold 223 may be formed to have a size satisfying Equation 9 and Equation 10:

$$0 < \frac{r_{1,in}}{a_3} \leq \frac{1}{4} \quad \text{[Equation 9]}$$

wherein $r_{1,in}$ is the radius of the semicircles 2231, 2231' located at both ends of the first inlet manifold 223 and $a_3$ is the length of the side of the center portion 21 adjacent to the first inlet manifold 223

$$0 \leq \frac{d_1}{a_3} \leq \frac{1}{2} \quad \text{[Equation 10]}$$

wherein $d_1$ is the distance between the centers of the semicircles 2231, 2231' located at both ends of the first inlet manifold 223 and $a_3$ is the length of the side of the center portion 21 adjacent to the first inlet manifold 223.

Figure 15:
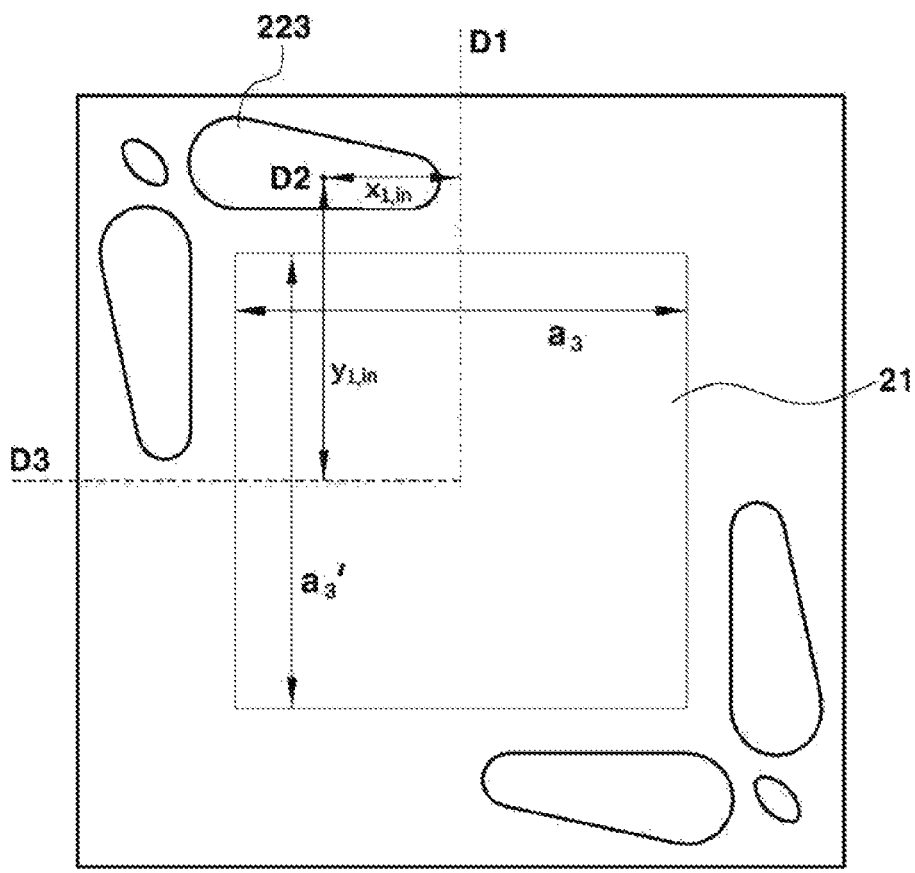
FIG. 15 is a reference view for illustrating the location of a first inlet manifold of a separator.

FIG. 15 is a reference view for illustrating the location of the first inlet manifold 223. Referring to the figure, the first inlet manifold 223 may be formed at a location satisfying Equation 11 and Equation 12:

$$0.2 \leq \frac{x_{1,in}}{a_3} \leq 0.4 \quad \text{[Equation 11]}$$

wherein $a_3$ is the length of one side of the center portion 21 adjacent to the first inlet manifold 223 and $x_{1,in}$ is the shortest length between a perpendicular line D1 extending from the midpoint of the one side and the center of gravity D2 of the first inlet manifold 223

$$\frac{1}{2} \leq \frac{y_{1,in}}{a'_3} \leq 1 \quad \text{[Equation 12]}$$

wherein $a_3'$ is the length of the other side connected to the one side of the center portion 21 adjacent to the first inlet manifold 223 and $y_{1,in}$ is the shortest length between a perpendicular line D3 extending from the midpoint of the other side and the center of gravity D2 of the first inlet manifold 223.

Figure 16:
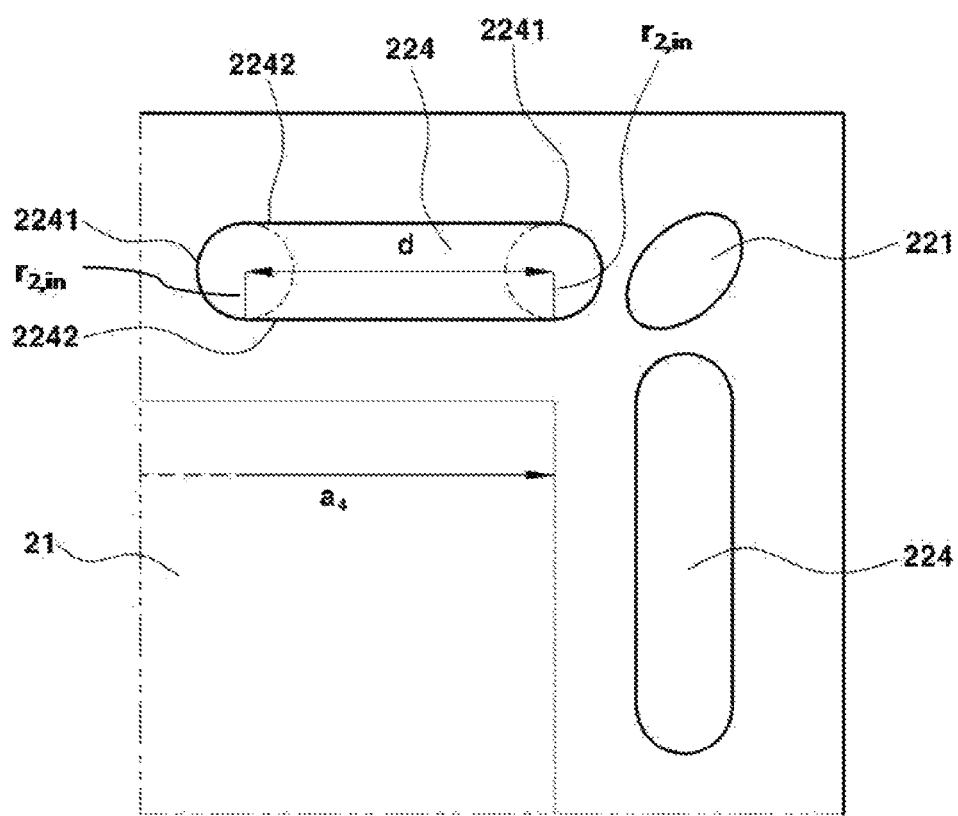
FIG. 16 is a reference view for illustrating the shape and location of a second inlet manifold of a separator according to an exemplary embodiment of the present invention.

FIG. 16 is a reference view for illustrating the shape and location of the second inlet manifold 224. Referring to FIG. 4 and FIG. 16, the second inlet manifold 224 may be located along the side of the center portion 21 between the first outlet manifold 221 and the second outlet manifold 222, adjacent to the first outlet manifold 221, and formed through perforation.

Specifically, the second inlet manifold 224 may be formed through perforation to have a shape wherein the ends of semicircles 2241 having the same radius $r_{2,in}$ and spaced by a predetermined distance are connected by straight lines 2242, wherein the straight lines 2242 connecting the ends of the semicircles are parallel or approximately parallel to the side of the center portion 21.

Figure 17:
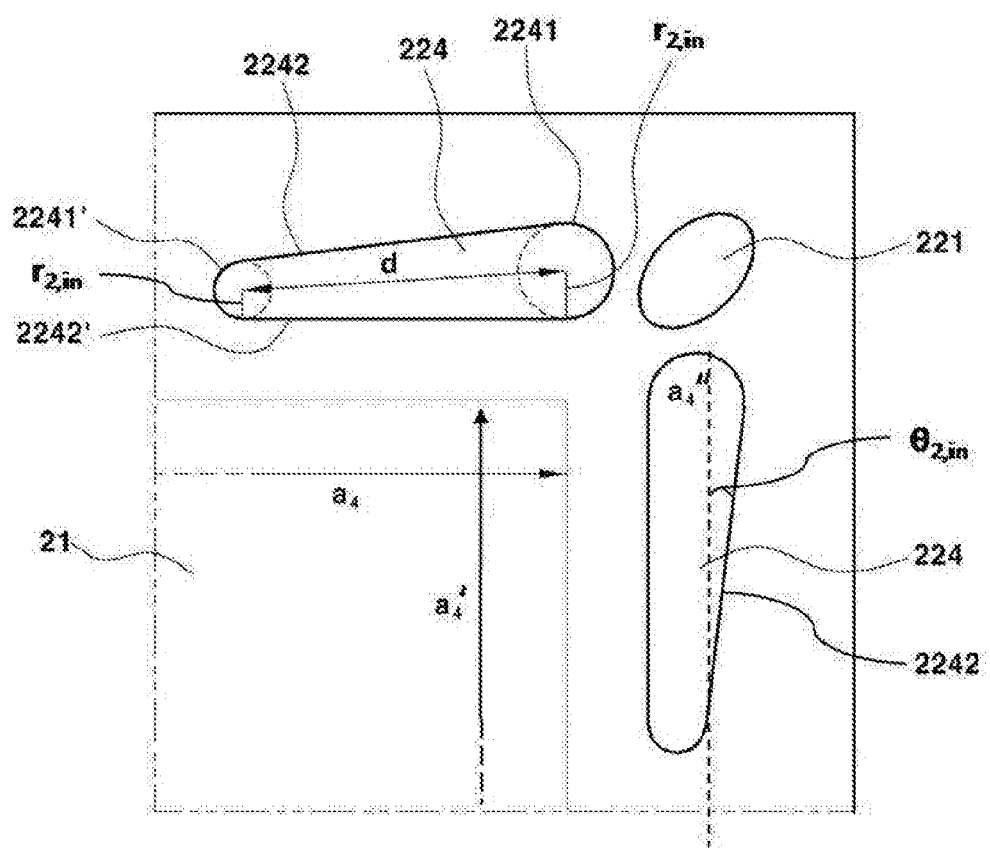
FIG. 17 is a reference view for illustrating the shape and location of a second inlet manifold of a separator according to another exemplary embodiment of the present invention.

As seen from FIG. 17, the second inlet manifold 224 may be formed through perforation to have a shape wherein the semicircles 2241, 2241' have different radius, the semicircle 2241 having a longer radius from among the semicircles 2241, 2241' is located toward the corner of the center portion 21 and the straight line 2242' closer to the center portion 21 from among the straight lines 2242, 2242' connecting the ends of the semicircles 2241, 2241' is parallel or approximately parallel to the side of the center portion 21.

Also, the second inlet manifold 224 may be formed through perforation to have a shape wherein an angle $\theta_{2,in}$ formed between the straight line 2242 farther from the center portion 21 from among the straight lines 2242, 2242' connecting the ends of the semicircles 2241, 2241' and the side $a_4$ or $a_4'$ of the center portion 21 (or an imaginary line $a_4''$ which is parallel to the side of the center portion 21) is greater than 0° and equal to or smaller than 45°.

If the second inlet manifold 224 is formed to have a symmetrical shape, the flow volume of the fuel introduced near the corner of the center portion becomes the same or similar to the flow volume of the fuel introduced near the midpoint of one side of the center portion. In this case, it is highly likely that the fuel may not flow smoothly near the center of the unit cell 10 at which the center portion is located due to hydrodynamic flow resistance. Therefore, by forming the second inlet manifold 224 asymmetrically as shown in FIG. 17, the flow volume of the fuel introduced near the corner of the center portion may be increased and, accordingly, the fuel may flow smoothly near the center of the unit cell 10.

The second inlet manifold 224 may be formed to have a size satisfying Equation 13 and Equation 14:

$$0 < \frac{r_{2,in}}{a_4} \leq \frac{1}{4} \quad \text{[Equation 13]}$$

wherein $r_{2,in}$ is the radius of the semicircles 2241, 2241' located at both ends of the second inlet manifold 224 and $a_4$ is the length of the side of the center portion 21 adjacent to the second inlet manifold 224

$$0 \leq \frac{d_2}{a_4} \leq \frac{1}{2} \quad \text{[Equation 14]}$$

wherein $d_2$ is the distance between the centers of the semicircles 2241, 2241' located at both ends of the second inlet manifold 224 and $a_4$ is the length of the side of the center portion 21 adjacent to the second inlet manifold 224.

Figure 18:
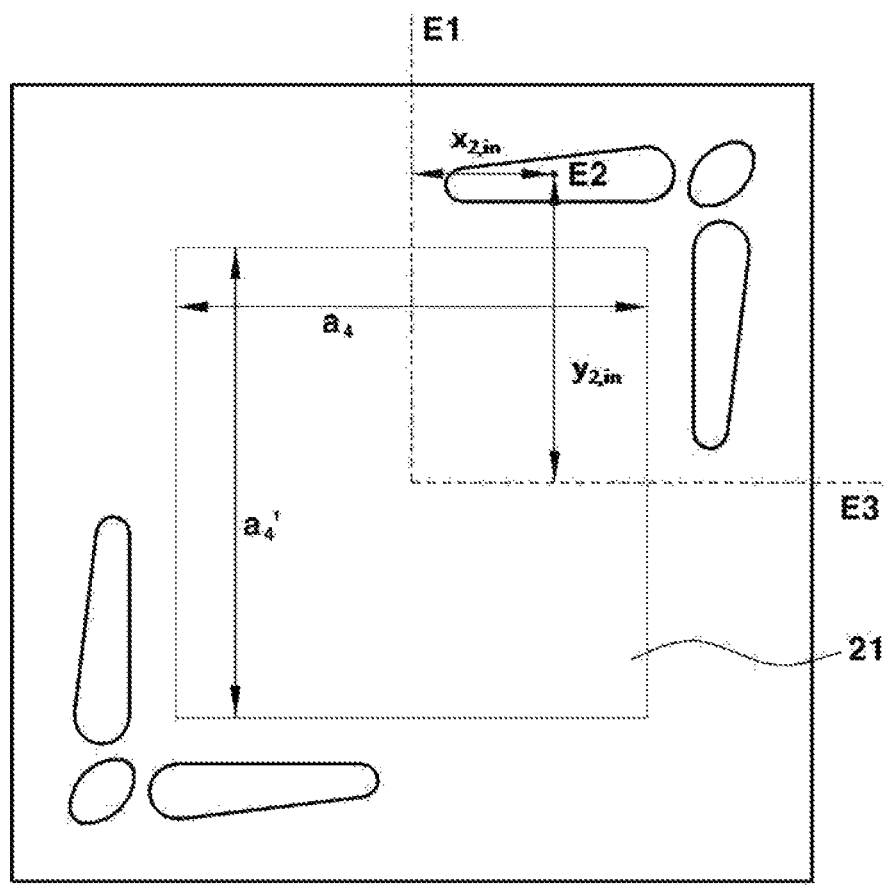
FIG. 18 is a reference view for illustrating the location of a second inlet manifold of a separator.

FIG. 18 is a reference view for illustrating the location of the second inlet manifold 224. Referring to the figure, the second inlet manifold 224 may be formed at a location satisfying Equation 15 and Equation 16:

$$0.2 \leq \frac{x_{2,in}}{a_4} \leq 0.4 \quad \text{[Equation 15]}$$

wherein $a_4$ is the length of one side of the center portion 21 adjacent to the second inlet manifold 224 and $x_{2,in}$ is the shortest length between a perpendicular line E1 extending from the midpoint of the one side and the center of gravity E2 of the second inlet manifold 224

$$\frac{1}{2} \le \frac{y_{2,in}}{a'_4} \le 1 \quad \text{[Equation 16]}$$

wherein $a_4'$ is the length of the other side connected to the one side of the center portion 21 adjacent to the second inlet manifold 224 and $y_{2,in}$ is the shortest length between a perpendicular line E3 extending from the midpoint of the other side and the center of gravity E2 of the second inlet manifold 224.

The first inlet manifold 223 may be formed to have a larger area than the second inlet manifold 224. When the fuel cell stack 1 is operated, the required amount of the oxidizer is larger than that of the fuel and the flow rate is also about 10 times faster. Therefore, if the first inlet manifold 223 to which the oxidizer is introduced and the second outlet manifold 224 to which the fuel is introduced are formed to have the same or similar area, it is highly likely that pressure difference occurs in the fuel cell stack 1. Accordingly, in the present invention, the first inlet manifold 223 is formed to have a larger area than the second inlet manifold 224, thereby decreasing the flow rate of the oxidizer inside the fuel cell stack 1 and reducing pressure difference resulting therefrom.

The separator 20 according to the present invention may be one wherein the first inlet manifold 223 and the second inlet manifold 224 are formed through perforation to have larger areas than the first outlet manifold 221 and the second outlet manifold 222. The inventors of the present invention have found out that the heat transfer path inside the fuel cell stack 1 greatly affects the temperature gradient and that the heating due to the high operation temperature of the fuel cell stack 1 has a larger effect on the oxidizer and the fuel introduced to the inlet manifolds. Therefore, the first inlet manifold 223 and the second inlet manifold 224 are formed to have larger areas in order to decrease temperature variation inside the fuel cell stack 1.

Hereinafter, the flow of the oxidizer and the fuel inside the fuel cell stack 1 constructed by alternatingly stacking the unit cell 10 and the separator 20 is described in detail referring to FIGS. 19-24.

Although FIGS. 19-24 are presented as plan views for the convenience of explanation of the flow of the oxidizer and the fuel inside introduced and discharged through the separator 20, it should be understood that the flow of the oxidizer and the fuel is three-dimensional.

Figure 19:
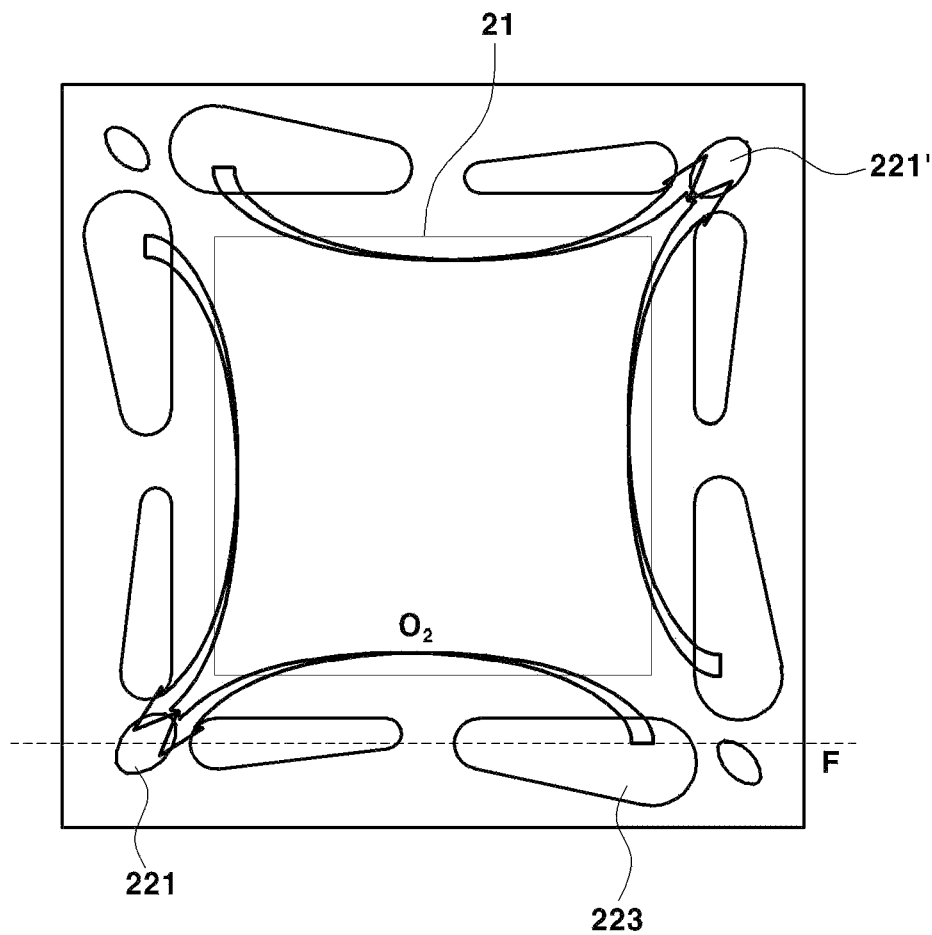
FIG. 19 shows the flow of an oxidizer in a fuel cell stack according to an exemplary embodiment of the present invention.

FIG. 19 shows the flow of the oxidizer in the fuel cell stack 1. Referring to the figure, the oxidizer ($O_2$) introduced into the first inlet manifold 223 located along an imaginary line F parallel to one side of the center portion 21 may pass through the air electrode 11 of the unit cell 10 and then may be discharged out of the first outlet manifold 221 located along the imaginary line F from among a pair of first outlet manifolds 221, 221'.

Figure 20:
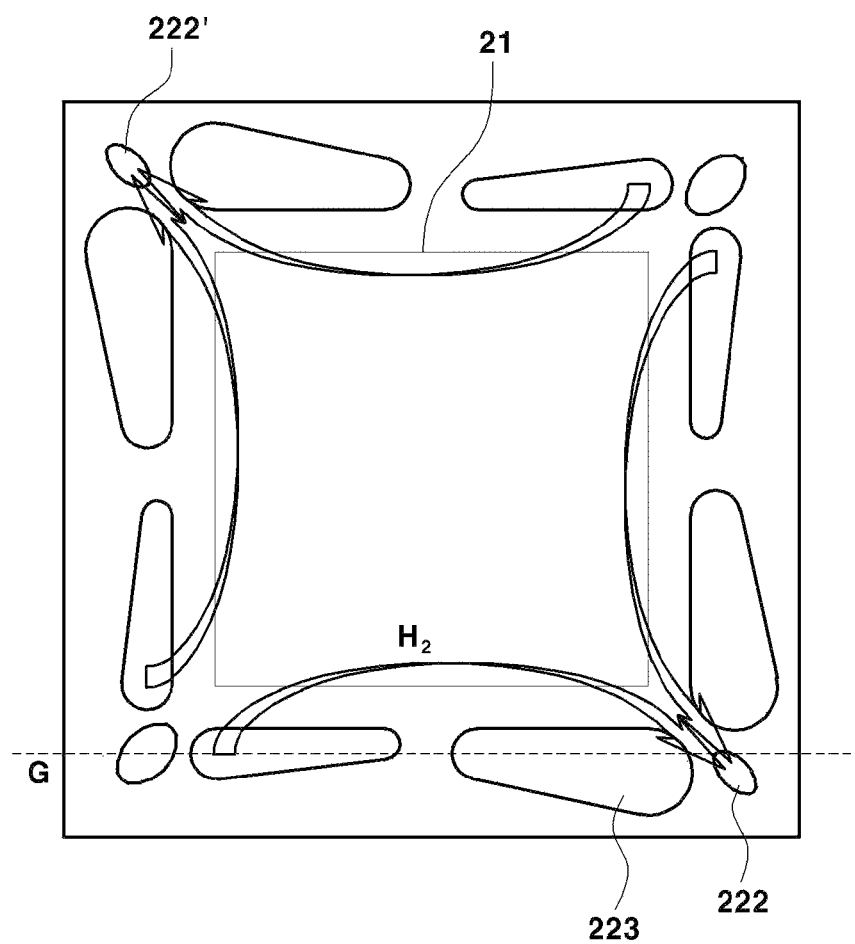
FIG. 20 shows the flow of a fuel in a fuel cell stack according to an exemplary embodiment of the present invention.

FIG. 20 shows the flow of the fuel in the fuel cell stack 1. Referring to the figure, the fuel ($H_2$) introduced into the second inlet manifold 224 located along an imaginary line G parallel to one side of the center portion 21 may pass through the fuel electrode 13 of the unit cell 10 and then may be discharged out of the second outlet manifold 224 located along the imaginary line G from among a pair of second outlet manifolds 222, 222'.

The present invention is characterized in that the oxidizer and the fuel can form a counter flow and a cross flow at the same time in the fuel cell stack 1 by specifying the shape, location and size of the first outlet manifold 221, the second outlet manifold 222, the first inlet manifold 223 and the second inlet manifold 224 as described above.

Figure 21:
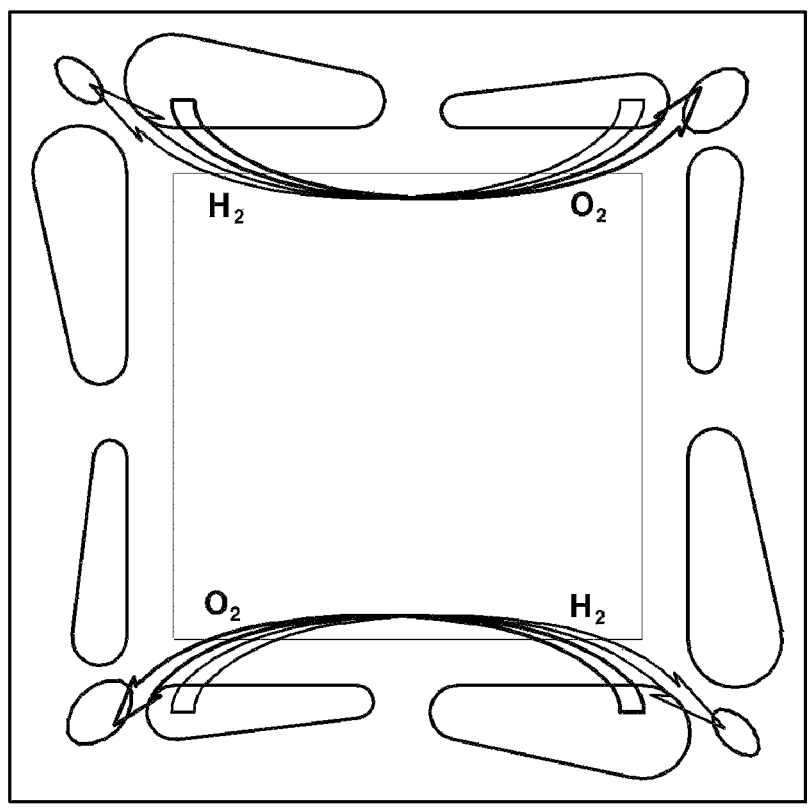
FIG. 21 shows a counter flow of an oxidizer and a fuel in a fuel cell stack according to an exemplary embodiment of the present invention.
Figure 22:
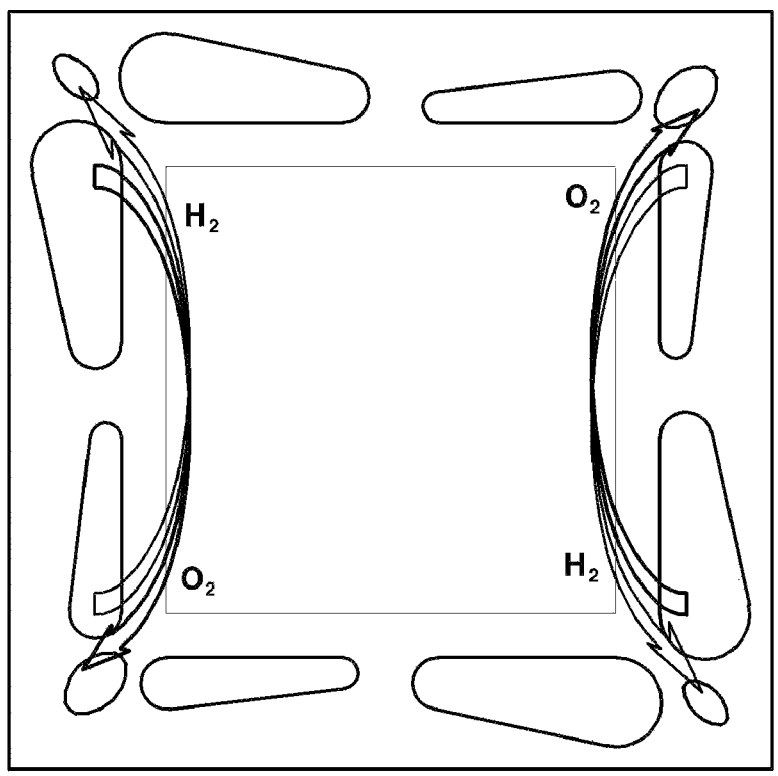
FIG. 22 shows another counter flow of an oxidizer and a fuel in a fuel cell stack according to an exemplary embodiment of the present invention.
Figure 23:
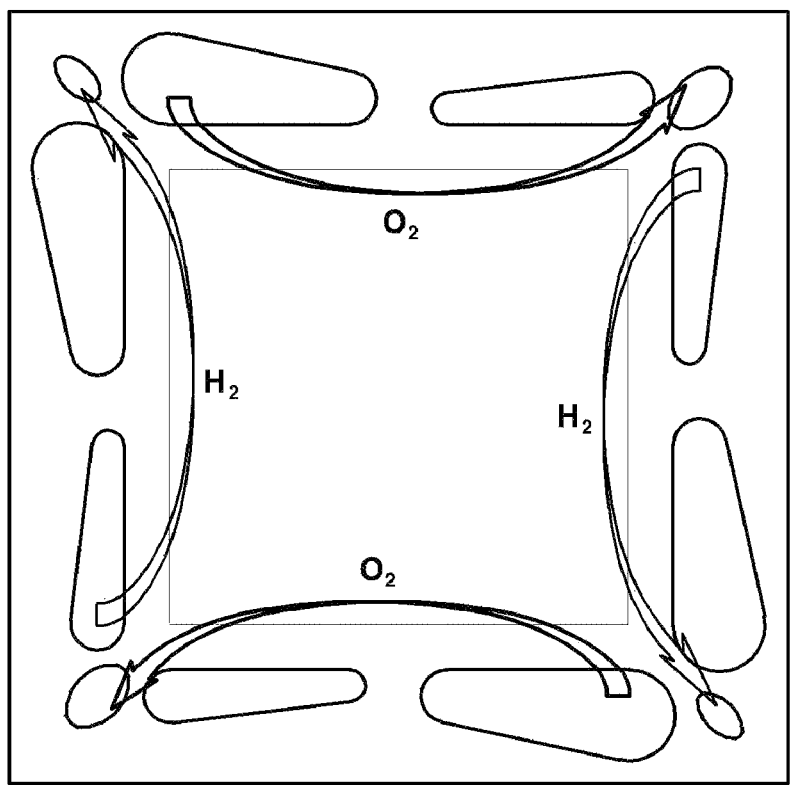
FIG. 23 shows a cross flow of an oxidizer and a fuel in a fuel cell stack according to an exemplary embodiment of the present invention.
Figure 24:
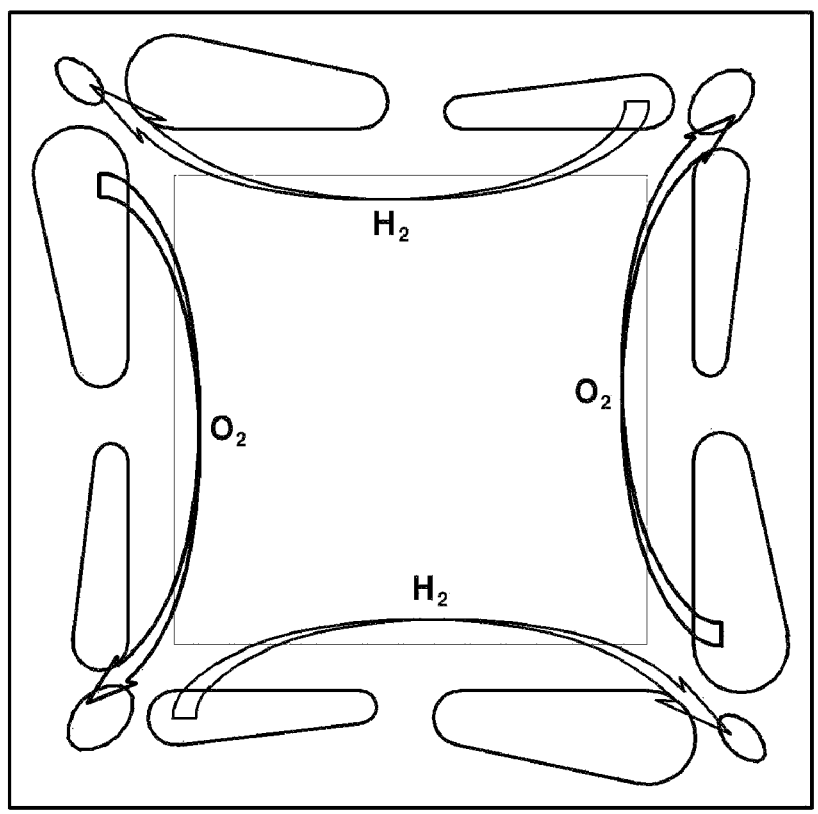
FIG. 24 shows another cross flow of an oxidizer and a fuel in a fuel cell stack according to an exemplary embodiment of the present invention.

FIG. 21 and FIG. 22 show the counter flow of the oxidizer and the fuel and the FIG. 23 and FIG. 24 show the cross flow of the oxidizer and the fuel.

Because the oxidizer ($O_2$) is discharged through the air electrode and the fuel ($H_2$) is discharged through the fuel electrode, it should not be understood as if the flow of the oxidizer ($O_2$) and the fuel ($H_2$) in FIGS. 21-24 occurs in the same plane.

First, in the fuel cell stack 1 according to an exemplary embodiment of the present invention, the oxidizer ($O_2$) and the fuel ($H_2$) form a counter flow as shown in FIG. 21 and FIG. 22. Therefore, the temperature gradient inside the fuel cell stack 1 can be decreased and the thermal gradient in each unit cell 10 can be minimized. As a result, no variation in temperature, reactant concentration, power, etc. occurs between each unit cell. Consequently, the durability of the fuel cell stack 1 is greatly improved because interlayer peeling or microcracking is prevented.

Also, in the fuel cell stack 1 according to an exemplary embodiment of the present invention, the oxidizer ($O_2$) and the fuel ($H_2$) form a cross flow as shown in FIG. 23 and FIG. 24. In particular, because the cross flow is formed such that the oxidizer ($O_2$) and the fuel ($H_2$) are introduced through the first inlet manifold and the second inlet manifold formed on the four sides of the peripheral portion, the volume of the fuel cell stack 1 can be reduced remarkably. Accordingly, the power density per unit volume of the fuel cell stack 1 is greatly improved.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A separator for a fuel cell, comprising:
   a tetragonal center portion; and
   a peripheral portion disposed to surround the center portion,
   wherein the peripheral portion comprises:
   a first outlet manifold located at one pair of corners facing each other with respect to the center portion and formed through perforation;
   a second outlet manifold located at the other pair of corners facing each other with respect to the center portion and formed through perforation;
   a first inlet manifold located along the side of the center portion between the first outlet manifold and the second outlet manifold, adjacent to the second outlet manifold, and formed through perforation; and
   a second inlet manifold located along the side of the center portion between the first outlet manifold and the second outlet manifold, adjacent to the first outlet manifold, and formed through perforation,
   wherein the first outlet manifold is formed through perforation to have a larger area than the second outlet manifold and the first inlet manifold is formed through perforation to have a larger area than the second inlet manifold.

2. The separator for a fuel cell according to claim 1, wherein the first outlet manifold is formed at a location satisfying Equation 1 and Equation 2:

$$\frac{1}{2} \leq \frac{x_{1,out}}{a_1} \leq 1 \qquad \text{[Equation 1]}$$

wherein $a_1$ is the length of one side constituting the corners of the center portion adjacent to the first outlet manifold and $x_{1,out}$ is the shortest length between a perpendicular line extending from the midpoint of the one side and the center of the first outlet manifold $$\frac{1}{2} \leq \frac{y_{1,out}}{a'_1} \leq 1 \qquad \text{[Equation 2]}$$

wherein $a_1'$ is the length of the other side constituting the corners of the center portion adjacent to the first outlet manifold and $y_{1,out}$ is the shortest length between a perpendicular line extending from the midpoint of the other side and the center of the first outlet manifold.

3. The separator for a fuel cell according to claim 1, wherein the first outlet manifold has a shape of an ellipse satisfying Equation 3 and Equation 4:

$$0 < \frac{2 \cdot r_{11,out}}{L} \leq 0.2 \qquad \text{[Equation 3]}$$

wherein $r_{11,out}$ is the semi-major axis of the first outlet manifold and L is the distance between the corners of the center portion facing each other $$0 < \frac{r_{12,out}}{r_{11,out}} < 1 \qquad \text{[Equation 4]}$$

wherein $r_{11,out}$ is the semi-major axis of the first outlet manifold and $r_{12,out}$ is the semi-minor axis of the first outlet manifold.

4. The separator for a fuel cell according to claim 1, wherein the second outlet manifold has a shape of an ellipse and is formed to be spaced by a predetermined distance from the corners of the center portion such that an imaginary line extending from the major axis of the ellipse passes through both of the one pair of corners facing each other with respect to the center portion.

5. The separator for a fuel cell according to claim 1, wherein the second outlet manifold has a shape of an ellipse and is formed to be spaced by a predetermined distance from the corners of the center portion such that an angle formed between an imaginary line extending from the major axis of the ellipse and an imaginary line passing through both of the one pair of corners facing each other with respect to the center portion is 0-90°.

6. The separator for a fuel cell according to claim 1, wherein the second outlet manifold is formed at a location satisfying Equation 5 and Equation 6:

$$\frac{1}{2} \leq \frac{x_{2,out}}{a_2} \leq 1 \qquad \text{[Equation 5]}$$

wherein $a_2$ is the length of one side constituting the corners of the center portion adjacent to the second outlet manifold and $x_{2,out}$ is the shortest length between a perpendicular line extending from the midpoint of the one side and the center of the second outlet manifold $$\frac{1}{2} \leq \frac{y_{2,out}}{a'_2} \leq 1 \qquad \text{[Equation 6]}$$

wherein $a_2'$ is the length of the other side constituting the corners of the center portion adjacent to the second outlet manifold and $y_{2,out}$ is the shortest length between a perpendicular line extending from the midpoint of the other side and the center of the second outlet manifold.

7. The separator for a fuel cell according to claim 1, wherein the second outlet manifold has a shape of an ellipse satisfying Equation 7 and Equation 8:

$$0 < \frac{2 \cdot r_{21,out}}{L} \leq 0.2 \qquad \text{[Equation 7]}$$

wherein $r_{21,out}$ is the semi-major axis of the second outlet manifold and L is the distance between the corners of the center portion facing each other $$0 < \frac{r_{22,out}}{r_{21,out}} < 1 \qquad \text{[Equation 8]}$$

wherein $r_{21,out}$ is the semi-major axis of the second outlet manifold and $r_{22,out}$ is the semi-minor axis of the second outlet manifold.

8. The separator for a fuel cell according to claim 1, wherein the first inlet manifold and the second inlet manifold are formed through perforation to have a shape wherein ends of semicircles having the same or different radius and spaced by a predetermined distance are connected by straight lines.

9. The separator for a fuel cell according to claim 8, wherein the first inlet manifold and the second inlet manifold are formed through perforation to have a shape wherein the semicircles have different radius, the semicircle having a longer radius from among the semicircles is located toward the corner of the center portion and the straight line closer to the center portion from among the straight lines connecting the ends of the semicircles is parallel to the side of the center portion.

10. The separator for a fuel cell according to claim 8, wherein the first inlet manifold and the second inlet manifold are formed through perforation to have a shape wherein an angle formed between the straight line farther from the center portion from among the straight lines connecting the ends of the semicircles and the side of the center portion is greater than 0° and equal to or smaller than 45°.

11. The separator for a fuel cell according to claim 8, wherein the first inlet manifold is formed to have a size satisfying Equation 9 and Equation 10:

$$0 < \frac{r_{1,in}}{a_3} \leq \frac{1}{4} \qquad \text{[Equation 9]}$$

wherein $r_{1,in}$ is the radius of the semicircles located at both ends of the first inlet manifold and $a_3$ is the length of the side of the center portion adjacent to the first inlet manifold $$0 \le \frac{d_1}{a_3} \le \frac{1}{2}$$ [Equation 10]

wherein $d_1$ is the distance between the centers of the semicircles located at both ends of the first inlet manifold and $a_3$ is the length of the side of the center portion adjacent to the first inlet manifold.

12. The separator for a fuel cell according to claim 8, wherein the first inlet manifold is formed at a location satisfying Equation 11 and Equation 12:

$$0.2 \le \frac{x_{1,in}}{a_3} \le 0.4$$ [Equation 11]

wherein $a_3$ is the length of one side of the center portion adjacent to the first inlet manifold and $x_{1,in}$ is the shortest length between a perpendicular line extending from the midpoint of the one side and the center of gravity of the first inlet manifold $$\frac{1}{2} \le \frac{y_{1,in}}{a'_3} \le 1$$ [Equation 12]

wherein $a_3'$ is the length of the other side connected to the one side of the center portion adjacent to the first inlet manifold and $y_{1,in}$ is the shortest length between a perpendicular line extending from the midpoint of the other side and the center of gravity of the first inlet manifold.

13. The separator for a fuel cell according to claim 8, wherein the second inlet manifold is formed to have a size satisfying Equation 13 and Equation 14:

$$0 < \frac{r_{2,in}}{a_4} \le \frac{1}{4}$$ [Equation 13]

wherein $r_{2,in}$ is the radius of the semicircles located at both ends of the second inlet manifold and $a_4$ is the length of the side of the center portion adjacent to the second inlet manifold $$0 \le \frac{d_2}{a_4} \le \frac{1}{2}$$ [Equation 14]

wherein $d_2$ is the distance between the centers of the semicircles located at both ends of the second inlet manifold and $a_4$ is the length of the side of the center portion adjacent to the second inlet manifold.

14. The separator for a fuel cell according to claim 8, wherein the second inlet manifold is formed at a location satisfying Equation 15 and Equation 16:

$$0.2 \le \frac{x_{2,in}}{a_4} \le 0.4$$ [Equation 15]

wherein $a_4$ is the length of one side of the center portion adjacent to the second inlet manifold and $x_{2,in}$ is the shortest length between a perpendicular line extending from the midpoint of the one side and the center of gravity of the second inlet manifold $$\frac{1}{2} \le \frac{y_{2,in}}{a'_4} \le 1$$ [Equation 16]

wherein $a_4'$ is the length of the other side connected to the one side of the center portion adjacent to the second inlet manifold and $y_{2,in}$ is the shortest length between a perpendicular line extending from the midpoint of the other side and the center of gravity of the second inlet manifold.

15. A fuel cell stack wherein a unit cell comprising an air electrode, an electrolyte and a fuel electrode and the separator according to claim 1 are stacked alternatingly.

16. The fuel cell stack according to claim 15, wherein an oxidizer introduced into the first inlet manifold located along an imaginary line parallel to one side of the center portion passes through the air electrode and then is discharged out of the first outlet manifold located along the imaginary line and a fuel introduced into the second inlet manifold located along an imaginary line parallel to one side of the center portion passes through the fuel electrode and then is discharged out of the second outlet manifold located along the imaginary line.

17. The fuel cell stack according to claim 15, wherein the oxidizer and the fuel flow in a cross-flow manner and in a counter-flow manner.

18. A separator for a fuel cell comprising:
a tetragonal center portion; and
a peripheral portion disposed to surround the center portion,
wherein the peripheral portion comprises:
a first outlet manifold located at one pair of corners facing each other with respect to the center portion and formed through perforation;
a second outlet manifold located at the other pair of corners facing each other with respect to the center portion and formed through perforation;
a first inlet manifold located along the side of the center portion between the first outlet manifold and the second outlet manifold, adjacent to the second outlet manifold, and formed through perforation; and
a second inlet manifold located along the side of the center portion between the first outlet manifold and the second outlet manifold, adjacent to the first outlet manifold, and formed through perforation, wherein
the first outlet manifold has a shape of an ellipse and is formed to be spaced by a predetermined distance from the corners of the center portion such that an imaginary line extending from the major axis of the ellipse passes through both of the one pair of corners facing each other with respect to the center portion.

19. A separator for a fuel cell comprising:
a tetragonal center portion; and
a peripheral portion disposed to surround the center portion, wherein the peripheral portion comprises:
a first outlet manifold located at one pair of corners facing each other with respect to the center portion and formed through perforation;
a second outlet manifold located at the other pair of corners facing each other with respect to the center portion and formed through perforation;
a first inlet manifold located along the side of the center portion between the first outlet manifold and the second outlet manifold, adjacent to the second outlet manifold, and formed through perforation; and
a second inlet manifold located along the side of the center portion between the first outlet manifold and the second outlet manifold, adjacent to the first outlet manifold, and formed through perforation,
wherein the first outlet manifold has a shape of an ellipse and is formed to be spaced by a predetermined distance from the corners of the center portion such that an angle formed between an imaginary line extending from the major axis of the ellipse and an imaginary line passing through both of the one pair of corners facing each other with respect to the center portion is 0-90°.

* * * * *